United States Patent Office 3,284,396
Patented Nov. 8, 1966

3,284,396
RUBBER LATEX SUBJECTED TO A FREEZE-THAW CYCLE IN THE PRESENCE OF A PLASTICIZER
Leon Talalay, New Haven, Conn., assignor to The B. F. Goodrich Company, New York, N.Y., a corporation of New York
No Drawing. Filed Sept. 12, 1960, Ser. No. 55,161
9 Claims. (Cl. 260—29.7)

This invention relates to latices and pertains more particularly to butadiene hydrocarbon polymer latices in which the butadiene hydrocarbon polymer particles of the latex are plasticized with a liquid plasticizer for the butadiene hydrocarbon polymer and to a process for incorporating the liquid plasticizer into the butadiene hydrocarbon polymer particles of the latex.

It normally is desirable to add a plasticizer to rubber to improve the processing characteristics of the rubber or to "extend" the rubber and thereby allow larger quantities of filler pigments to be added to the rubber while still providing a composition having suitable physical properties. When compounding a "dry" rubber the plasticizer can be added conveniently to the rubber on a roll mill or in an internal mixer such as a Banbury mixer, although in the manufacture of millable synthetic rubber employing emulsion-polymerization to form first a latex of the synthetic rubber polymer followed by coagulation of the latex to produce a millable rubber it has become the prefered practice to plasticize the rubber by adding a liquid plasticizer for the polymer to the latex before the latex is coagulated and then coagulating the latex-plasticizer blend. After coagulation of the latex, the plasticizer is found to have penetrated into the rubber. It will be apparent that neither of these techniques for plasticizing millable rubber are available for producing an internally-plasticized latex (that is, a latex in which polymer particles of the latex actually contain plasticizer). The mere addition of a liquid plasticizer in the form of an aqueous emulsion to the latex followed even by vigorous stirring of the latex does not produce a satisfactory incorporation of the liquid plasticizer into the polymer particles of the latex. While in some instances part of the plasticizer may migrate into the polymer particles of the latex if allowed to stand for a prolonged period of time (usually 48 hours or more), such time frequently is beyond the life expectancy of a plasticizer emulsion. Quite often the minute droplets of plasticizer coalesce after even a short period of time and separate from the aqueous phase of the latex completely. It is quite apparent, then, that a convenient and economical process for incorporating a liquid plasticizer into the polymer of the latex would be extremely beneficial.

The present invention provides a process for conveniently and economically incorporating a liquid plasticizer into the polymer particles of a latex. In accordance with this invention, a liquid plasticizer is added to the latex and the latex is frozen to a solid frozen condition at a temperature above temperatures at which the latex coagulates. The liquid plasticizer either can be added to the latex as such and an emulsion of the plasticizer formed in situ in the latex by agitating the latex sufficiently to cause the plasticizer to be subdivided into droplet form (emulsifier present in the latex being utilized to maintain the plasticizer droplets in suspension in the aqueous phase of the latex after the plasticizer has been subdivided by agitation) before the latex is frozen or it can be added to the latex initially in the form of an aqueous emulsion of the plasticizer. The frozen latex then is thawed. The freezing and/or thawing of the latex forces the plasticizer into the polymer particles of the latex, the plasticizer remaining in the polymer particles after the latex is thawed.

Emulsion-polymerized aqueous dispersions of butadiene hydrocarbon polymer can be internally-plasticized (that is, have a plasticizer incorporated into the individual polymer particles of the latex) by the process of this invention. The term "butadiene hydrocarbon polymer" as used herein refers to any polymer containing at least 51 percent by weight of a bound butadiene-1,3 hydrocarbon, such as butadiene-1,3 itself or its homologs such as isoprene, 1,4-dimethyl butadiene-1,3, 2,3-dimethyl butadiene-1,3 and the like, and includes homopolymers of butadiene-1,3 hydrocarbons such as polyisoprene and polybutadiene as well as interpolymers of butadiene-1,3 hydrocarbons with one another or with up to 49 percent by weight of one or more other unsaturated monomers copolymerizable therewith such as styrene and substituted styrenes, acrylic and methacrylic acids and their esters and nitriles, vinyl pyridine and other unsaturated vinyl and vinylidene monomers.

Since the process of this invention involves freezing the latex after the liquid plasticizer has been added thereto, it is apparent that only latices which can be frozen to a solid condition without coagulating objectionably can be used. It is necessary in accordance with the present invention that the latex at the time it is frozen be surface-unsaturated (that is, the surfaces of the particles of polymer in the latex are not completely covered with emulsifier). It is preferable that the latex be one that has been polymerized using a fatty acid soap as the emulsifier, preferably a sodium or potassium soap of a fatty acid (either saturated or unsaturated) having from 12 to 18 carbon atoms. The process of this invention is useful for internally-plasticizing latices of any concentration.

Any liquid plasticizer which does not solidify at the temperature at which the latex is to be frozen and which is a plasticizer for the particular butadiene hydrocarbon polymer of the latex may be used. Plasticizers for the various butadiene hydrocarbon polymers are well known and those most appropriate for plasticizing the butadiene hydrocarbon polymer of a particular latex in accordance with this invention will be apparent. Among the liquid plasticizers commonly used for plasticizing butadiene hydrocarbon polymers are esters such as dibutyl phthalate, dioctyl phthalate, tributyl glycerol triphthalate, dicapryl phthalate, hexahydrobutyl phthalate, cyclohexyl butyl phthalate, dimethoxy ethyl phthalate, tetrahydrofurfuryl sebacate, dibutyl sebacate, tricresyl phosphate, amyl octyl orthophosphate (iso), ditetrahydrofurfuryl adipate, benzyl benzoate, ethyl ricinoleate, butyl napthenate and diamyl maleate, aromatic hydrocarbons such as diamyl naphthalene, amyl benzyl napthalene, triamyl benzene and acenaphthalene, chlorinated hydrocarbons such as chloronapthalene (alpha), ethyl polychlorobenzene and amyl chloronapthalene, ethers such as dibenzyl ether, nitro diphenyl ether (ortho), hexyl ether, glyceryl monoisopropyl ether, diphenyl ether and diphenyl bornyl ether, ketones such as diisopropylidene acetone, xylyl heptadecyl ketone, chlorodimethyl benzophenone and hydrogenated difurfurylidine acetone, vegetable oils such as raw linseed oil, raw cottonseed oil, raw palm oil and tall oil, mineral oils such as paraffin base oil (pale), unsaturated petroleum oils, and terpenes such as terpineal. It will be appreciated that the plasticizers enumerated above all are non-volatile liquid plasticizers.

Probably, the most commonly used plasticizers for plasticizing butadiene hydrocarbon polymers which are not oil resistant polymers are petroleum oils. Various methods for classifying petroleum oils have been devised. One method which is used quite generally in industry for classifying petroleum oils is the classification system developed by Sun Oil Company and known as the Sun Oil Classification System for Petroleum Oils. This classification system is based upon the "viscosity-gravity constant" (VGC) of petroleum oils as determined by the following formula:

$$VGC = \frac{G - 0.24 - 0.022 \log(V_1 - 35.5)}{0.755}$$

where G is the specific gravity of the oil at 60° F. and $V_1$ is the Saybolt Universal viscosity of the oil at 210° F., and petroleum oils are classified in accordance with their viscosity-gravity constant as follows:

| Type of oil: | Viscosity-gravity constant range |
| --- | --- |
| Paraffinic | 0.790 to 0.819 |
| Relatively paraffinic | 0.820 to 0.849 |
| Naphthenic | 0.850 to 0.899 |
| Relatively aromatic | 0.900 to 0.949 |
| Aromatic | 0.950 to 0.999 |
| Very aromatic | 1.000 to 1.049 |
| Extremely aromatic | 1.050 and above |

Of the various petroleum oils, those preferred for use in the present invention are petroleum oils having a viscosity-gravity constant from 0.820 to 1.000. Petroleum oils which fall within this preferred viscosity-gravity constant range are classified by the Sun Oil Classification System as relatively paraffinic oils, naphthenic oils, relatively aromatic oils and aromatic oils. It will be quite apparent, of course, that if the butadiene hydrocarbon polymer of the latex is a polymer which is resistant to petroleum oils (butadiene-acrylonitrile polymers, for example) a plasticizer other than a petroleum oil would need to be used. The results of a rather comprehensive study of plasticizers for use in plasticizing butadiene-styrene (SBR) synthetic rubbers is found in India Rubber World, volume III, pages 55–62 and 180–186 (1944).

The amount of plasticizer which would need to be added to the latex to produce desired optimum physical properties in the product formed from the latex will vary, of course, depending upon the particular plasticizer being used and the butadiene hydrocarbon polymer in the latex. Normally, up to 50 parts by weight of the liquid plasticizer based upon 100 parts by weight of the butadiene hydrocarbon polymer is added, although larger amounts of the plasticizer may be aded if desired. It is desirable that the plasticizer be subdivided into as small a droplet as possible (the droplets of plasticizer in the plasticizer-emulsion preferably being 1.0 to 2.0 microns or smaller) to insure that the plasticizer is as uniformly dispersed throughout the latex as is possible.

When the plasticizer is added to the latex in the form of an aqueous emulsion of the plasticizer, the emulsion can be made in the usual manner using an emulsifier to maintain the minute droplets of plasticizer in suspension in the emulsion. Any emulsifier which does not alter the chemical structure of the plasticizer and is compatible with the latex can be used. For example, alkali metal fatty acids soaps such as sodium oleate, potassium oleate, potassium laurate, potassium stearate, sodium ricinoleate and sodium myristate, ammonium soaps such as ammonium oleate, ammonium laurate and ammonium ricinoleate and non-ionic emulsifiers such as ethoxylated fatty alcohol and poly-ethoxyphenol may be used as the emulsifier provided that the particular emulsifier chosen does not chemically affect the particular plasticizer being employed and provided that it is compatible with the latex. Emulsifiers which may be used with a particular liquid plasticizer to form a stable emulsion are well known in the industry. Since it is necessary that the surfaces of the polymer particles of the latex be incompletely covered with emulsifier at the time the latex is frozen, the amount of emulsifier used to form the plasticizer-emulsion should be kept to a minimum so that the total amount of emulsifier in the latex at the time the latex is frozen is insufficient to cause complete coverage of the surfaces of the polymer particles of the latex with emulsifier. It is apparent that the maximum amount of emulsifier which can be used to form the plasticizer-emulsion intended to be added to the latex will vary depending upon the amount of emulsifier present in the latex initially and the total surface area of the polymer particles in the latex before the latex is frozen. Normally, it is preferred that the total amount of emulsifier in the latex after the addition thereto of the plasticizer-emulsion not exceed about 5 parts by weight (dry) of emulsifier for every 100 parts by weight (dry) of the butadiene hydrocarbon polymer in the latex.

The latex after the plasticizer-emulsion has been added thereto is frozen to a solid state and then is remelted in any convenient way. The frozen latex need not be retained in a frozen condition for more than a moderate time (1 to 5 seconds being sufficient), since apparently the plasticizer is forced into the butadiene hydrocarbon polymer particles either at the time the latex changes from a fluid to the frozen solid phase or at the time the frozen latex changes from the solid to the fluid state upon thawing. The latex preferably is frozen as rapidly as possible and, also, is thawed as rapidly as is practical in order to obtain optimum results. Excellent results have been obtained by freezing the latex (after the addition of the plasticizer) on the surface of a slowly revolving metal drum which is partly immersed in a reservoir of the latex. As the drum revolves and the peripheral surface of the drum is withdrawn from the reservoir of latex, a layer of the latex adheres to the drum surface. The drum is internally cooled with brine maintained at a sufficiently low temperature that the temperature of the peripheral surface of the drum is below the freezing temperature of the aqueous phase of the latex whereby the thin layer of laytex adhering to the peripheral surface of the drum is completely frozen within a very short time (usually within about 2 to 10 seconds). The frozen layer of latex is scraped from the surface of the drum by means of a doctor blade into a heated agitator tank in which the frozen latex is rapidly thawed. The thawed latex then is drained from the tank. Throughout the freezing and thawing operations, the particles of polymer in the latex remain uniformly dispersed in the aqueous phase of the latex.

Upon thawing, not only has liquid plasticizer been forced into the butadiene hydrocarbon polymer of the latex, but, also, agglomeration of the latex has occurred (that is, the average particle size of the polymer in the latex has increased as the result of coalescence of several small polymer particles to form larger particles). The process of agglomerating a butadiene hydrocarbon polymer latex by freezing is described in my copending application, Serial No. 601,612, filed August 2, 1956, now U.S. Patent No. 3,031,427. As pointed out in the said copending application, the conditions at which the latex is frozen and then thawed affect the degree of agglomeration which occurs. In order to obtain optimum results when using the process of the present invention, the same conditions required to obtain optimum results in practicing the invention described in the said copending application should be employed. Although the temperature at which the latex (containing the plasticizer) is frozen may be any temperature at which the latex will freeze to a solid condition which is above temperatures at which the latex coagulates, the latex preferably is frozen at a temperature as low as possible. However, at lower freezing temperatures approaching temperatures at which the latex coagulates, an objectionable amount of coagulum may be present in the thawed latex. If the amount of coagulum which may be formed would be objectionable, considering the purpose for which the latex is intended to be used, the amount of coagulum formed in the latex can be reduced or completely eliminated by freezing and/or thawing the latex more rapidly and/or by freezing the latex at a higher temperature. Normally, the latex is frozen at from 30 to −50° F., although in some instances it may be desirable to freeze the latex at even lower temperatures as long as the temperature is not sufficiently low to coagulate the latex. As pointed out heretofore, the latex preferably is frozen to a solid condition as rapidly as possible, desirably within 5 minutes and preferably within 1 minute after it is subjected to the temperature at which it is to be frozen.

The pH of the latex (after the plasticizer has been added thereto) should be considered. Normally, improved results can be obtained if the pH of the latex is reduced before being frozen. However, reducing the pH of the latex has the effect of destabilizing the latex and too great a reduction in pH will cause the latex to coagulate when frozen, particularly if the latex is frozen at a relatively low temperature. If coagulation of the latex occurs when it is frozen, either the pH of the latex and/or the temperature at which the latex is frozen should be raised to overcome this condition.

The amount and type of emulsifier used in making the latex has an effect on the stability of the latex during the freezing and thawing of the latex. If too little of the surface area of the particles of polymer in a latex is covered with emulsifier, the latex will be relatively unstable and cannot be frozen at low temperatures and pH without coagulating. If such a condition exists, the addition of emulsifier to the latex before the latex is frozen generally will improve the stability of the latex. However, it should be remembered that, if the surfaces of the particles of butadiene hydrocarbon polymer are completely covered with emulsifier, the desired plasticization of the polymer particles (and agglomeration thereof) will not occur. Therefore, as pointed out above, there should not be sufficient emulsifier in the latex at the time of freezing to cause complete surface coverage of the polymer particles with emulsifier. Preferably, from 20 to 80 percent of the surface area of the polymer particle is covered with emulsifier at the time the latex is frozen.

The latex after having been frozen to a solid condition should be thawed as rapidly as possible since it has been found that more coagulum tends to be formed if the latex is thawed slowly than when the latex is thawed rapidly. The presence of an appreciable amount of coagulum in the thawed latex is considered objectionable in some instances. For example, the presence of over about 1 percent coagulum usually is considered to be objectionable in the manufacture of foam rubber, even though the presence of greater amounts of coagulum in the thawed latex are not objected to in the manufacture of certain other products from latex.

In the manufacture of rubber products from a butadiene hydrocarbon polymer synthetic latex, it has been found that certain physical properties of the product can be enhanced if the butadiene hydrocarbon polymer particles are internally reinforced with a reinforcing material such as with a finely-divided resinous polymer or with a finely-divided solid inorganic material. The internal reinforcement of the butadiene hydrocarbon polymer of the latex can be achieved by blending a resinous polymer latex with the butadiene hydrocarbon polymer latex or by adding an aqueous dispersion of a finely-divided inorganic material to the butadiene hydrocarbon polymer latex, freezing the resulting mixture to a solid frozen condition at a temperature above temperatures at which the butadiene hydrocarbon polymer latex coagulates and thawing the frozen mass. It was found that the freezing and/or thawing of the latex caused butadiene hydrocarbon polymer particles in the latex to coalesce to form larger particles and in so doing to engulf reinforcing pigment particles in the larger particles being formed to provide butadiene hydrocarbon polymer particles in the latex which were internally reinforced with reinforcing pigment. Products made from a butadiene hydrocarbon polymer latex whose butadiene hydrocarbon polymer particles are internally reinforced with a reinforcing pigment are superior in certain respects to products made either from the butadiene hydrocarbon polymer latex alone or from a mixture of the butadiene hydrocarbon polymer latex and the reinforcing pigment. However, normally the ultimate elongation of a product is somewhat lower when a butadiene hydrocarbon polymer latex whose butadiene hydrocarbon polymer particles have been internally reinforced with reinforcing pigment is used to make the product than if the butadiene hydrocarbon polymer latex is used alone. This same phenomenon is experienced when a reinforcing pigment is milled into a "dry" rubber composition. This reduction in the ultimate elongation is objectionable in those instances where high ultimate elongation is a property desired in the product. The present invention provides a method whereby the ultimate elongation loss normally resulting from the internal reinforcement of the butadiene hydrocarbon polymer particles with reinforcing pigment can be partly if not completely eliminated without objectionably affecting the other physical properties of products made from the internally-reinforced latex. The forcing of a liquid plasticizer into the butadiene hydrocarbon polymer particles of a butadiene hydrocarbon polymer latex internally reinforced with reinforcing pigment tends to increase the ultimate elongation property of a product made from the latex. In accordance with this invention, the liquid plasticizer is forced into the butadiene hydrocarbon polymer of the particles internally reinforced with reinforcing pigment by adding liquid plasticizer as described above to the latex either before the mixture of butadiene hydrocarbon polymer latex and reinforcing pigment is frozen or after internal reinforcement of the butadiene hydrocarbon polymer particles has been accomplished and then freezing and thawing the latex.

The conditions for freezing and thawing are the same as those described above in connection with freezing the plasticizer and butadiene hydrocarbon polymer latex together without the presence of the reinforcing pigment in the latex. As indicated above, at the time the latex is frozen the butadiene hydrocarbon polymer particles must not be completely covered with emulsifier, that is, they must be surface-unsaturated. Also, the temperature at which the latex is frozen may be any temperature at which the latex freezes so long as the temperature is above temperatures at which the latex coagulates, although it is preferred to use as low a freezing temperature as possible. It has been mentioned above that at the lower freezing temperatures approaching those at which coagulation occurs, the presence of an objectionable amount of coagulum may be observed in the thawed latex. If the amount of coagulum is objectionable, the amount of coagulum formed can be reduced or completely eliminated by freezing and/or thawing the latex more rapidly and/or by freezing the latex at a higher temperature. It also was mentioned above that it is desirable to reduce the pH of the latex before freezing, so long as the pH reduction does not so destabilize the latex that coagulation occurs when the latex is frozen. If coagulation of the butadiene hydrocarbon polymer latex does occur upon freezing, either the pH of the latex and/or the temperature at which the latex is frozen should be raised to overcome this condition.

Any resinous polymer latex can be added to the butadiene hydrocarbon polymer latex in order to reinforce the butadiene hydrocarbon polymer of the butadiene hydrocarbon polymer latex by the process described herein. Such resinous polymer latices include polystyrene latices, polyvinyl chloride latices, polyvinyl acetate latices, polyvinylidene chloride latices, polyvinyl butyral latices, polyacrylonitrile latices, polymethyl methacrylate latices, polyethylacrylate latices, butadiene-styrene copolymer latices in which the butadiene-styrene polymer constituent of the latex contains a predominant amount by weight of bound styrene, butadiene-acrylonitrile copolymer latices in which the butadiene-acrylonitrile polymer constituent of the latex contains a predominant amount by weight of bound acrylonitrile, butadiene-vinylidene chloride copolymer latices in which the butadiene-vinylidene chloride polymer constituent of the latex contains a predominant amount by weight of bound vinylidene chloride, butadiene-methacrylate copolymer latices in which the butadiene-methacrylate polymer constituent of the latex contains a predominant amount by weight of bound methacrylate, butadiene-vinyl pyridine copolymer latices in which the butadiene-vinyl pyridine constituent of the latex contains a predominant amount by weight of bound vinyl pyridine, ethyl acrylate-vinylidene chloride copolymer latices in which the ethyl acrylate-vinylidene chloride polymer constituent of the latex contains a predominant amount by weight of bound vinylidene chloride, and ethyl acrylate-vinyl chloride copolymer latices in which the ethyl acrylate-vinyl chloride polymer constituent of the latex contains a predominant amount by weight of bound vinyl chloride. A resinous polymer latex for the purpose of this invention is any latex in which the polymer constituent has a second order transition temperature above room temperature. The second order transition temperature of a polymer is the temperature at which an abrupt change occurs in the coefficient of cubical or volume expansion of the polymer. The expansion property of polymers is discussed in an article by R. J. Clash, Jr., and L. M. Rynkiewicz appearing in Industrial and Engineering Chemistry, vol. 36, 1944, pages 279–282.

The aqueous dispersion of inorganic reinforcing pigment which may be used to internally reinforce the butadiene hydrocarbon polymer particles of the butadiene hydrocarbon polymer latex may be a dispersion of any finely-divided solid inorganic material suitable for reinforcing rubber compositions. The inorganic materials suitable for this purpose are well known to the rubber compounder. Those most commonly used are finely-divided carbon (commonly referred to as carbon blacks), calcium carbonate, clays, talc (magnesium silicate, hydrous magnesium silicate, calcium silicate or mixtures thereof), pyrophyllite (hydrous aluminum silicate), barytes (barium sulfate), blanc fixe (barium sulfate), whiting (by-product calcium carbonate or ground limestone), silica and silicon monoxide (monox). The dispersion of inorganic material is made in the usual manner employing a dispersing agent to retain the finely-divided pigment in suspension.

Up to 50 or more parts by weight (dry) of the reinforcing material for every 100 parts by weight (dry) of butadiene hydrocarbon polymer can be added to the butadiene hydrocarbon polymer latex, and up to 50 or more parts by weight of plasticizer (dry) for every 100 parts by weight (dry) of butadiene hydrocarbon polymer can be added to the butadiene hydrocarbon polymer latex conveniently and economically by the process herein described. Desirably, the reinforcing material has an average particle size of less than 2000 A.

The invention is illustrated by the following examples, although it will be understood that the invention is not intended to be limited to these illustrations.

Example I

A petroleum oil emulsion was prepared by mixing 100 parts by weight of the petroleum oil (Gulf Processing Oil No. 565 having a VGC of 0.867) with 4.40 parts by weight of oleic acid and by mixing 0.89 part by weight of potassium hydroxide with 44.71 parts by weight of water (warm) and then blending the two mixtures together and running the blend through an ultra-sonic homogenizer. 15 parts by weight of the emulsion (10 parts by weight of the petroleum oil) per 100 parts by weight of butadiene hydrocarbon polymer was blended into a commercial butadiene-styrene copolymer latex (70 butadiene–30 styrene copolymer, Ameripol 4850 latex) and the latex was frozen at −20° F. to a solid frozen condition. The frozen latex was maintained frozen for about 10 seconds and then was thawed. Upon thawing it was found that the petroleum oil had been forced into the butadiene-styrene polymer particles of the latex.

Example II 30 parts by weight of the petroleum oil emulsion used in Example I (20 parts by weight of the petroleum oil) per 100 parts by weight of butadiene hydrocarbon polymer was blended into another sample of the butadiene-styrene copolymer latex used in Example I and the blend was frozen at −20° F. to a solid frozen condition. After the latex had remained frozen for about 10 seconds, the frozen latex was thawed and it was found that the petroleum oil had been forced into the butadiene-styrene polymer particles of the latex.

Example III 45 parts by weight of the petroleum oil emulsion used in Example I (30 parts by weight of the petroleum oil) per 100 parts by weight of butadiene hydrocarbon polymer was blended into another sample of the butadiene-styrene copolymer latex used in Example I and the blend was frozen at −20° F. to a solid frozen condition. After the latex had remained frozen for about 10 seconds, the frozen latex was thawed and it was found that the petroleum oil had been forced into the butadiene-styrene polymer particles of the latex.

Example IV

An aqueous emulsion of 25 parts by weight of tricresyl phosphate, 5 parts by weight of sodium laurate and 70 parts by weight of water was prepared by mixing the three components together in a Waring Blendor. 40 parts by weight of the emulsion (10 parts by weight of tricresyl phosphate) was thoroughly mixed into 100 parts by weight (dry) of a commercial butadiene-acrylonitrile copolymer latex (80 butadiene–20 acrylonitrile copolymer) and the latex was frozen rapidly to a solid condition at −25° F. The latex was allowed to remain frozen for about 10 seconds and then was thawed. Upon thawing, it was found that the tricresyl phosphate had been forced into the butadiene-acrylonitrile copolymer particles of the latex.

Example V

A sample of a commercial butadiene-styrene latex (70 butadiene–30 styrene, Ameripol 4850 latex) having a total solids of about 31% was deposited in a thin layer on the surface of a metal drum by revolving the drum partially immersed in the latex. The latex on the surface of the metal drum was frozen to a solid frozen condition within 5 to 10 seconds by maintaining the surface of the metal drum at −15° F. After the latex had remained frozen for about 10 seconds, it was scraped from the surface of the metal drum into a heated tank and rapidly thawed. The thawed latex then was concentrated by evaporation to a total solids of about 62% and was formed into a foam rubber slab (Slab Sample 1).

15 parts by weight (dry) of a polystyrene latex (Lustrex 615 latex) for every 100 parts by weight (dry) of butadiene-styrene latex was blended into a second sample of the butadiene-styrene latex (Ameripol 4850 latex) and the latex was frozen, thawed and concentrated as described above. The latex then was formed into a foam rubber slab (Slab Sample 2).

15 parts by weight (dry) of the polystyrene latex (Lustrex 615 latex) for every 100 parts by weight (dry) of butadiene-styrene latex and 10 parts by weight (dry) of a petroleum oil emulsion (composed of 100 parts by weight of Gulf Processing Oil No. 565, 5 parts by weight of potassium oleate and 45 parts by weight of water blended together in a Waring Blendor) for every 100 parts by weight (dry) of butadiene-styrene latex was blended into a third sample of the butadiene-styrene latex (Ameripol 4850 latex). The latex was frozen, thawed and concentrated as described above and was formed into a foam rubber slab (Slab Sample 3).

Slabs Samples 1, 2 and 3 had the following physical properties:

| Property | Slab Sample 1 | Slab Sample 2 | Slab Sample 3 |
|---|---|---|---|
| Compression Index | 108 | 188 | 139 |
| Ultimate elongation (percent) | 114 | 87 | 134 |

From this example, it will be noted that the ultimate elongation of the foam rubber slab made from the latex which had been internally reinforced with polystyrene but to which no oil had been added (Slab Sample 2) was considerably lower than the ultimate elongation of the foam rubber slab made from the latex which had been merely freeze agglomerated (Slab Sample 1) but that the ultimate elongation of the foam rubber slab made from the latex to which both polystyrene and oil had been added before the latex was frozen (Slab Sample 3) was higher even than the ultimate elongation of Slab Sample 1, and that although the compression index of Slab Sample 3 was not as great as Slab Sample 2, it, nevertheless, was greater than the compression index of Slab Sample 1.

Example VI

A commercial butadiene-styrene copolymer latex (70 butadiene–30 styrene copolymer, Ameripol 4850 latex) was freeze agglomerated and concentrated as described in Example V to a total solids of 68.0%. A foam rubber slab (Slab Sample 4) was formed therefrom.

15 parts by weight (dry) of a high-styrene butadiene-styrene copolymer resin latex (85 styrene–15 butadiene copolymer) per 100 parts by weight (dry) of the Ameripol 4850 butadiene-styrene copolymer latex was blended with four other samples of the Ameripol 4850 butadiene-styrene latex (Samples 5, 6, 7 and 8). A petroleum oil emulsion (the same emulsion as used in Example I) then was added to three of these four samples (Samples 6, 7 and 8), 10 parts by weight (dry) of said petroleum oil per 100 parts by weight (dry) of the Ameripol 4850 butadiene-styrene latex being added to Sample 6, 20 parts by weight (dry) of said petroleum oil per 100 parts by weight (dry) of the Ameripol 4850 butadiene-styrene latex being added to Sample 7 and 30 parts by weight (dry) of said petroleum oil per 100 parts by weight (dry) of the Ameripol 4850 butadiene-styrene latex being added to Sample 8. 2 parts by weight (dry) of additional emulsifier was added to each of the four samples 5, 6, 7 and 8. All four of the latex samples (Samples 5, 6, 7 and 8) then were frozen and thawed as described in Example V and were concentrated by evaporation to 64.3%, 62.8%, 63.5% and 63.6% total solids, respectively. The four latex samples then were formed into foam rubber slabs, Slab Sample 5 from latex Sample 5, Slab Sample 6 from latex Sample 6, Slab Sample 7 from latex Sample 7 and Slab Sample 8 from latex Sample 8. The five foam rubber slabs (Slabs Samples 4 through 8) had the following properties:

| Property | Foam Rubber Slab Sample | | | | |
|---|---|---|---|---|---|
| | 4 | 5 | 6 | 7 | 8 |
| Compression Index | 108 | 169 | 116 | 108 | 86 |
| Tensile/density of foam rubber | 1,220 | 2,050 | 2,440 | 2,720 | 2,920 |
| Elongation (percent) | 115 | 120 | 126 | 141 | 279 |
| Hot Set | 4 | 7 | 5 | 6 | 6 |

The following example illustrates that the mere addition of a reinforcing material and plasticizer to a latex without subsequently freezing and thawing the latex does not produce the same effect as when the latex is subsequently frozen and thawed.

Example VII

To each of two samples (latex Samples 9 and 10) of a butadiene-styrene copolymer latex (70 butadiene–30 styrene copolymer, SBR 2105 latex) was added 15 parts by weight (dry) of a high-styrene butadiene-styrene copolymer resin latex (85 styrene–15 butadiene copolymer, Hycar 2507 latex) and 15 parts by weight of the petroleum oil emulsion described in Example I (10 parts by weight of the petroleum oil) for every 100 parts by weight (dry) of the butadiene-styrene copolymer latex. Latex Sample 10 then was frozen and thawed in the manner described in Example V. Both latex samples were concentrated by evaporation to a total solids of about 60%. Foam rubber slabs then were made from latex Samples 9 and 10 and were identified as foam rubber Slab Samples 9 and 10, respectively. The foam rubber samples possessed the following physical properties:

| Property | Foam Rubber Slab Samples | |
|---|---|---|
| | 9 | 10 |
| Compression Index | 190 | 167 |
| Tensile/density of foam rubber | 2,540 | 3,880 |
| Elongation (percent) | 112 | 145 |
| Hot Set | 7.2 | 5.5 |
| Volume Shrinkage (percent) | 24.9 | 22.8 |

The incorporation of liquid plasticizer into the butadiene hydrocarbon polymer of the butadiene hydrocarbon polymer latex permits the addition of greater amounts of an inexpensive filler material to the latex compositions without materially adversely affecting the physical properties of foam rubber made therefrom as illustrated by the following example.

Example VIII

To each of two samples (latex Samples 11 and 12) of a butadiene-styrene copolymer latex (70 butadiene-30 styrene copolymer), the same latex as used in Example V, was added 15 parts by weight (dry) of a polystyrene latex (Lustrex 615 latex) and 10 parts by weight (dry) of the petroleum oil emulsion described in Example I for every 100 parts by weight (dry) of the butadiene-styrene copolymer latex. Latex Sample 12 then was frozen and thawed in the manner described in Example V. Latex Samples 11 and 12 were then each separated into four equal parts and were identified as latex Samples 11a, 11b, 11c and 11d and 12a, 12b, 12c and 12d. 10 parts by weight of filler (a pulverized limestone-silicate ore sold under the name Asbestol Superfine) were added to the latex Samples 11b and 12b, 20 parts by weight of the Asbestol Superfine filler were added to latex Samples 11c and 12c, and 30 parts by weight of the Asbestol Superfine filler were added to latex Samples 11d and 12d. Foam rubber slabs were then made from latex Samples 11a, 11b, 11c, 11d, 12a, 12b, 12c and 12d and were identified as foam rubber Slab Samples 11a, 11b, 11c, 11d, 12a, 12b, 12c and 12d, respectively. The foam rubber samples possessed the following physical properties:

| Property | Foam Rubber Slab Samples | | | | | | | |
|---|---|---|---|---|---|---|---|---|
| | 11a | 11b | 11c | 11d | 12a | 12b | 12c | 12d |
| Compression Index | 200 | 210 | 226 | 246 | 156 | 184 | 210 | 234 |
| Tensile/density of foam rubber | 1,480 | 1,300 | 1,160 | 1,040 | 2,080 | 1,720 | 1,470 | 1,330 |
| Elongation (percent) | 88 | 85 | 80 | 74 | 118 | 99 | 88 | 82 |
| Flex Softening | 29 | 36 | 43 | 49 | 15 | 26 | 37 | 47 |

It has been found, also, that if the plasticizer is added to the butadiene hydrocarbon polymer latex and the latex then is frozen and thawed as described herein before the reinforcing material is added to the latex, a further improvement in physical properties is realized as compared to merely adding both the plasticizer and reinforcing material to the butadiene hydrocarbon polymer latex and freezing and thawing the three materials together, as is illustrated by the following example.

*Example IX*

To 100 parts by weight of butadiene-styrene copolymer latex (70 butadiene–30 styrene copolymer, Ameripol 4850 latex) were added 20 parts by weight of the petroleum oil emulsion described in Example I. The blend was frozen and thawed. 20 parts by weight (dry) of polystyrene latex (Lustrex 615 latex) then was added to the 100 parts by weight of butadiene-styrene copolymer latex and the mixture was frozen and thawed. The thawed latex sample was identified as latex Sample 13. To 100 parts by weight of the same butadiene-styrene copolymer as used for preparing latex Sample 13 was added 20 parts by weight of the petroleum oil emulsion described in Example I and 20 parts by weight, (dry) of the Lustrex 615 polystyrene latex. This mixture (identified as latex Sample 14) was then frozen and thawed. Both latex Sample 13 and latex Sample 14 were concentrated by evaporation to a total solids of about 60%. Foam rubber slabs then were made from latex Samples 13 and 14 and were identified as foam rubber Slab Samples 13 and 14, respectively. The foam rubber samples possessed the following physical properties:

| Property | Foam Rubber Slab Samples | |
|---|---|---|
| | 13 | 14 |
| Compression Index | 284 | 286 |
| Tensile/density of foam rubber | 2,720 | 2,150 |
| Elongation (percent) | 173 | 154 |
| Hot Set | 9.1 | 12.7 |
| Impact Softening | 12.8 | 21.4 |

Latex which has had a liquid plasticizer incorporated into the butadiene hydrocarbon polymer of the latex by freezing and thawing the latex after the plasticizer has been added to the latex can be used immediately to make cored foam rubber in a mold without experiencing difficulty in stripping the foam rubber from the mold whereas, if the plasticizer merely is added to the latex, it will be necessary to age the latex before it can be used for making cored foam rubber. Also, foam rubber made using a latex in which a liquid plasticizer has been incorporated into the butadiene hydrocarbon polymer of the latex in accordance with the process of this invention exhibits less flex loss than foam rubber made from a latex to which a liquid plasticizer has been added merely by mixing the plasticizer into the latex. These advantages are illustrated by the following example.

*Example X*

To each of two samples (latex Samples 15 and 16) of a butadiene-styrene copolymer latex (70 butadiene–30 styrene copolymer, Ameripol 4850 latex) was added 15 parts by weight (dry) of a polystyrene latex (Lustrex 615 latex) and 15 parts by weight of the petroleum oil emulsion described in Example I for every 100 parts by weight (dry) of the butadiene-styrene copolymer latex. Latex Sample 16 then was frozen and thawed in the manner described in Example V. Both latex samples were concentrated by evaporation to a total solids of about 60%. The latex sample which had not been frozen and thawed (latex Sample 15) could not be used for making cored foam rubber without experiencing difficulty in stripping the foam rubber from the mold until after the latex had been aged for at least 40 hours whereas the latex sample which had been frozen and thawed could be used immediately. Foam rubber pads upon being flexed 175,000 times by repeatedly compressing the pads to 50% of their original height exhibited a flex compression loss of 28% for the foam rubber pads made from latex Sample 15 and a flex compression loss of only 15% for the foam rubber pads made from latex Sample 16.

The latex in which the butadiene hydrocarbon polymer particles have been plasticized by the process of this invention is useful for any application for which latices heretofore have been used, such as in the manufacture of foam rubber, dipped rubber articles and cast rubber articles.

It will be clear that obvious variations and modifications of this invention may be made without departing from the spirit and scope of this invention as defined in the appended claims.

I claim:
1. A method for internally plasticizing butadiene hydrocarbon polymer particles of an emulsion-polymerized butadiene hydrocarbon polymer synthetic latex which comprises preparing a mixture of an emulsion-polymerized butadiene hydrocarbon polymer synthetic latex and an aqueous emulsion of a liquid non-volatile plasticizer for the butadiene hydrocarbon polymer of the said butadiene hydrocarbon polymer latex, the said liquid plasticizer being one that is fluid at the temperature at which the mixture is to be frozen, the amount of emulsifier present in the mixture of butadiene hydrocarbon polymer latex and plasticizer-emulsion being insufficient to cause complete coverage of the surfaces of the butadiene hydrocarbon polymer particles in the mixture with emulsifier, and causing said liquid plasticizer of said mixture to penetrate into the polymer particles of the said butadiene hydrocarbon polymer synthetic latex of said mixture by freezing said mixture to a solid mass at a temperature above temperatures at which the said mixture coagulates and thawing the frozen mass.

2. A method for internally plasticizing butadiene hydrocarbon polymer particles of an emulsion-polymerized butadiene hydrocarbon polymer synthetic latex which comprises adding to an emulsion-polymerized butadiene hydrocarbon polymer latex a liquid non-volatile plasticizer for the butadiene hydrocarbon polymer of the latex, the said liquid plasticizer being one that is fluid at the temperature at which the said latex with liquid plasticizer therein is to be frozen, agitating the latex with liquid plasticizer added thereto sufficiently to emulsify the liquid plasticizer, the amount of emulsifier present in the mixture of butadiene hydrocarbon polymer latex and plasticizer-emulsion being insufficient to cause complete coverage of the surfaces of the butadiene hydrocarbon polymer particles in the mixture with emulsifier, and causing said liquid plasticizer of said mixture to penetrate into the polymer particles of the said butadiene hydrocarbon polymer synthetic latex of said mixture by freezing said mixture to a solid mass at a temperature above temperatures at which the said mixture coagulates and thawing the frozen mass.

3. A method for internally plasticizing butadiene hydrocarbon polymer particles of an emulsion-polymerized butadiene hydrocarbon polymer synthetic latex which comprises mixing an aqueous emulsion of a liquid non-volatile plasticizer for the butadiene hydrocarbon polymer of said latex into said latex, the said liquid plasticizer being one that is fluid at the temperature at which the resulting mixture of butadiene hydrocarbon polymer latex and liquid plasticizer-emulsion is to be frozen, the amount of emulsifier present in the mixture being insufficient to cause complete coverage of the surfaces of the butadiene hydrocarbon polymer particles in the mixture with emulsifier, and causing said liquid plasticizer of said mixture to penetrate into the polymer particles of the said butadiene hydrocarbon polymer synthetic latex of said mixture by freezing said mixture to a solid mass at a temperature above temperatures at which the said mixture coagulates and thawing the frozen mass.

4. A method for internally plasticizing butadiene hydrocarbon polymer particles of an emulsion-polymerized butadiene hydrocarbon polymer synthetic latex which comprises mixing an aqueous emulsion of a liquid non-volatile plasticizer for the butadiene hydrocarbon polymer of said latex into said latex, the said liquid plasticizer being one that is fluid at the temperature at which the resulting mixture of butadiene hydrocarbon polymer latex and liquid plasticizer-emulsion is to be frozen, the amount of emulsifier present in the mixture being insufficient to cause complete coverage of the surfaces of the butadiene hydrocarbon polymer particles in the mixture with emulsifier, and causing said liquid plasticizer of said mixture to penetrate into the polymer particles of the butadiene hydrocarbon polymer synthetic latex of said mixture by freezing said mixture to a solid mass at a temperature between 30° to —50° F. and at a temperature above temperatures at which the said mixture coagulates and thawing the frozen mass.

5. A method for internally plasticizing butadiene hydrocarbon polymer particles of an emulsion-polymerized butadiene hydrocarbon polymer synthetic latex which comprises mixing an aqueous emulsion of a liquid non-volatile plasticizer for the butadiene hydrocarbon polymer of said latex into said latex, the said liquid plasticizer being one that is fluid at the temperature at which the resulting mixture of butadiene hydrocarbon polymer latex and liquid plasticizer-emulsion is to be frozen, the amount of emulsifier present in the mixture being insufficient to cause complete coverage of the surfaces of the butadiene hydrocarbon polymer particles in the mixture with emulsifier, and causing said liquid plasticizer of said mixture to penetrate into the polymer particles of the said butadiene hydrocarbon polymer synthetic latex of said mixture by freezing said mixture to a solid mass at a temperature between 30° to—50° F. and at a temperature above temperatures at which the said mixture coagulates and within five minutes after the said mixture is subjected to the freeze temperature and thawing the frozen mass.

6. A method for internally plasticizing butadiene hydrocarbon polymer particles of an emulsion-polymerized butadiene hydrocarbon polymer synthetic latex which comprises preparing a mixture of an emulsion-polymerized butadiene hydrocarbon polymer synthetic latex and an aqueous emulsion of a liquid non-volatile plasticizer for the butadiene hydrocarbon polymer of the said latex, the said liquid plasticizer being one that is fluid at the temperature at which the mixture is to be frozen, the amount of emulsifier present in the mixture of butadiene hydrocarbon polymer latex and plasticizer-emulsion being insufficient to cause complete coverage of the surfaces of the butadiene hydrocarbon polymer particles in the mixture with emulsifier, reducing the pH of the said mixture to a pH value above pH values sufficient to cause coagulation of the said mixture, and causing said liquid plasticizer of said mixture to penetrate into the polymer particles of the said butadiene hydrocarbon polymer synthetic latex of said mixture by freezing said mixture to a solid mass at a temperature above temperatures at which the said mixture coagulates and thawing the frozen mass.

7. A method for producing an internally-plasticized internally-reinforced butadiene hydrocarbon polymer latex from an emulsion-polymerized butadiene hydrocarbon polymer synthetic latex which comprises mixing (1) an aqueous emulsion of a liquid plasticizer for the butadiene hydrocarbon polymer of the latex and (2) an aqueous dispersion of a reinforcing pigment for the butadiene hydrocarbon polymer into an emulsion-polymerized butadiene hydrocarbon polymer synthetic latex, the said liquid plasticizer being one that is fluid at the temperature at which the resulting mixture of butadiene hydrocarbon polymer latex, plasticizer-emulsion and reinforcing pigment dispersion is to be frozen, the amount of emulsifier present in the said mixture being insufficient to cause complete coverage of the polymer particles in the mixture with emulsifier, freezing said mixture to a solid mass at a temperature above temperatures at which the said mixture coagulates, and thawing the frozen mass.

8. A method for producing an internally-plasticized internally-reinforced butadiene hydrocarbon polymer latex from an emulsion-polymerized butadiene hydrocarbon polymer synthetic latex which comprises mixing an aqueous emulsion of a liquid plasticizer for the butadiene hydrocarbon polymer of the latex into the latex, the said liquid plasticizer being one that is fluid at the temperature at which the resulting mixture of latex and plasticizer-emulsion is to be frozen, the amount of emulsifier present in the said mixture being insufficient to cause complete coverage of the polymer particles in the mixture with emulsifier, freezing said mixture to a solid mass at a temperature above temperatures at which the said mixture coagulates, thawing the frozen mass, mixing an aqueous dispersion of a reinforcing pigment for the butadiene hydrocarbon polymer of the said emulsion-polymerized butadiene hydrocarbon polymer synthetic latex into the thawed latex, the amount of emulsifier present in the resulting mixture of thawed latex and reinforcing pigment dispersion being insufficient to cause complete coverage of the polymer particles in the mixture with emulsifier, freezing the mixture of thawed latex and reinforcing pigment dispersion to a solid mass at a temperature above temperatures at which the mixture coagulates, and thawing the frozen mass.

9. A method for producing an internally-plasticized internally-reinforced butadiene hydrocarbon polymer latex from an emulsion-polymerized butadiene hydrocarbon polymer synthetic latex which comprises mixing an aqueous dispersion of a reinforcing pigment for the butadiene hydrocarbon polymer of the said emulsion-polymerized butadiene hydrocarbon polymer synthetic latex into the latex, the amount of emulsifier present in the said mixture being insufficient to cause complete coverage of the polymer particles in the mixture with emulsifier, freezing said mixture to a solid mass at a temperature above temperatures at which the said mixture coagulates, thawing the frozen mass, mixing an aqueous emulsion of a liquid plasticizer for the butadiene hydrocarbon polymer of the latex into the thawed latex, the amount of emulsifier present in the resulting mixture of thawed latex and plasticizer-emulsion being insufficient to cause complete coverage of the polymer particles in the mixture with emulsifier, freezing the mixture of thawed latex and plasticizer-emulsion to a solid mass at a temperature above temperatures at which the mixture coagulates, and thawing the frozen mass.

References Cited by the Examiner
UNITED STATES PATENTS

| | | | |
|---|---|---|---|
| 2,412,182 | 12/1946 | Stephens | 260—746 |
| 2,450,578 | 10/1948 | Brown | 260—743 |
| 3,081,275 | 3/1963 | Reynolds | 260—23.7 |
| 3,214,401 | 10/1965 | McKenzie et al. | 260—29.7 |

(Other references on following page)

OTHER REFERENCES

Whitby: "Synthetic Rubber," pages 406, 650-651, and chapter 20 (complete), relied upon, John Wiley & Sons, Inc., New York; Sept. 15, 1954. (Copy in Scientific Library.)

Maron et al.: "Journal of American Chemical Society," volume 70, pages 582-7, particularly page 586, February 1948. (Copy in Scientific Library.)

Daniels et al.: "Rubber and Plastics Age," London, volume 40, No. 10, pages 1057-1061. (Copy in Scientific Library.)

"Compounding Ingredients for Rubber" (1961), pp. 175 and 209. (Copy in Scientific Library.)

LEON J. BERCOVITZ, *Primary Examiner.*

ALFONSO D. SULLIVAN, *Examiner.*

R. W. GRIFFIN, T. D. KERWIN, R. A. WHITE,
*Assistant Examiners.*